(12) United States Patent
Kozhaya et al.

(10) Patent No.: US 12,265,461 B2
(45) Date of Patent: Apr. 1, 2025

(54) INTELLIGENTLY OPTIMIZED MACHINE LEARNING MODELS

(71) Applicant: International Business Machines Corporation, Armonk, NY (US)

(72) Inventors: Joseph Kozhaya, Morrisville, NC (US); Elizabeth Spingola, Alexandria, VA (US); Paul Samuel Schweigert, Bayville, NY (US); Marcos Araque Fiallos, Elmwood Park, IL (US)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 17/693,710

(22) Filed: Mar. 14, 2022

(65) Prior Publication Data

US 2023/0289276 A1 Sep. 14, 2023

(51) Int. Cl.
*G06F 11/34* (2006.01)
*G06N 20/20* (2019.01)

(52) U.S. Cl.
CPC ......... *G06F 11/3428* (2013.01); *G06N 20/20* (2019.01)

(58) Field of Classification Search
CPC ............. G06F 11/3428; G06F 11/3409; G06F 11/3447; G06N 20/20; G06N 20/00
See application file for complete search history.

(56) References Cited

U.S. PATENT DOCUMENTS

| | | | |
|---|---|---|---|
| 10,621,513 B2 | 4/2020 | Deshpande | |
| 2015/0242979 A1* | 8/2015 | Abts | G06Q 50/2057 |
| | | | 705/328 |
| 2016/0148115 A1 | 5/2016 | Sirosh | |

(Continued)

FOREIGN PATENT DOCUMENTS

| | | |
|---|---|---|
| CN | 110058922 A | 7/2019 |
| CN | 110703899 A | 1/2020 |

OTHER PUBLICATIONS

International Searching Authority, "Notification of Transmittal of the International Search Report and the Written Opinion of the International Searching Authority, or the Declaration", File Reference IEE232042PCT, International application No. PCT/CN2023/075212, International Filing Date Feb. 9, 2023, Mailed on Mar. 14, 2023, 7 pages.

(Continued)

*Primary Examiner* — Manuel A Rivera Vargas
(74) *Attorney, Agent, or Firm* — Nicholas A. Welling

(57) ABSTRACT

An approach for intelligent optimization of machine learning models for a target environment may be provided herein. The approach may include extracting metadata from a training pipeline for a first machine learning model that has been configured to operate within a first computing environment. The approach may also include mapping the extracted metadata to one or more constraints associated with a second machine learning model that has been configured to operate within a second computing environment. The approach may also include training the second machine learning model configured to the second computing environment, with the dataset that was used to train the first machine learning model, based on the mapped constraints. The approach may also include comparing performance metrics of the first machine learning model to corresponding metrics of the now trained second machine learning model.

20 Claims, 6 Drawing Sheets

(56) References Cited

U.S. PATENT DOCUMENTS

| | | | |
|---|---|---|---|
| 2017/0124487 A1 | 5/2017 | Szeto | |
| 2020/0019882 A1 | 1/2020 | Garg | |
| 2020/0050965 A1* | 2/2020 | Harvill | G06N 5/04 |
| 2020/0184380 A1 | 6/2020 | Thomas | |
| 2021/0081848 A1 | 3/2021 | Polleri | |
| 2021/0241131 A1 | 8/2021 | Khawas | |
| 2022/0150560 A1* | 5/2022 | Kasal | H04N 21/44209 |
| 2023/0031691 A1* | 2/2023 | Carroll | G06N 3/045 |
| 2023/0049167 A1* | 2/2023 | Wilson | G06V 30/19107 |
| 2023/0169147 A1* | 6/2023 | Sivakumar | G06N 5/02 |
| | | | 382/159 |

OTHER PUBLICATIONS

"Ranking and automatic selection of machine learning models", An IP.com Prior Art Database Technical Disclosure, Authors et al.: Disclosed Anonymously, IP.com No. IPCOM000252275D, IP.com Electronic Publication Date: Jan. 3, 2018, 34 pages.

Hoos, Holger H., "Automated Artificial Intelligence (AutoAI)," ADA Research Group Technical Report TR-2018-1, Dec. 24, 2018, 12 pages.

Mell et al., "The NIST Definition of Cloud Computing", Recommendations of the National Institute of Standards and Technology, NIST Special Publication 800-145, Sep. 2011, 7 pages.

Preuveneers et al., "Resource Usage and Performance Trade-offs for Machine Learning Models in Smart Environments," Sensors 2020, 20, 1176, doi:10.3390/s20041176, 27 pages.

\* cited by examiner

INTELLIGENTLY OPTIMIZED MACHINE LEARNING MODELS

BACKGROUND OF THE INVENTION

The present invention relates generally to the field of machine learning and artificial intelligence, more specifically to optimizing machine learning models within the constraints of computing environments.

Machine learning models can be trained for numerous computing environments. Open source and proprietary libraries of machine learning models allow for data scientists and other users to train and evaluate machine learning models for various computing environments. The hardware and abstraction level can affect the performance and accuracy of machine learning models. Various deployment environments can include serial processing such as central processing units and parallel processing, such as graphical processing units. Further differentiating potential environments, a machine learning model can be deployed within include mobile phones, personal computers, server/cloud computing environments, and Internet of things devices.

Automated machine learning (AutoML) is the process of automating the manual tasks that data scientists must complete as they build and train machine learning models (ML models). These tasks include feature engineering and selection, choosing the type of machine learning algorithm, building an analytical model based on the algorithm, hyper-parameter optimization, training the model on tested data sets, and running the model to generate scores and findings.

SUMMARY

Embodiments of the present disclosure include a computer-implemented method computer system, and computer program product for intelligently optimizing machine learning models. The embodiments may include extracting metadata from a training pipeline for a first machine learning model, wherein the first machine learning model is configured to a first computing environment. Embodiments may also include mapping the extracted metadata to one or more constraints associated with a second machine learning model configured to a second computing environment. Further, embodiments may include training the second machine learning model configured to the second computing environment based, at least in part, on the mapped one or more constraints, with a dataset used to train the first machine learning model. Additionally, embodiments may include comparing one or more performance metrics of the first machine learning model to one or more performance metrics of the trained second machine learning model configured to the second computing environment.

These and other features and advantages will become apparent from the following detailed description of illustrative embodiments thereof, which is to be read in connection with the accompanying drawings.

Figure 1:
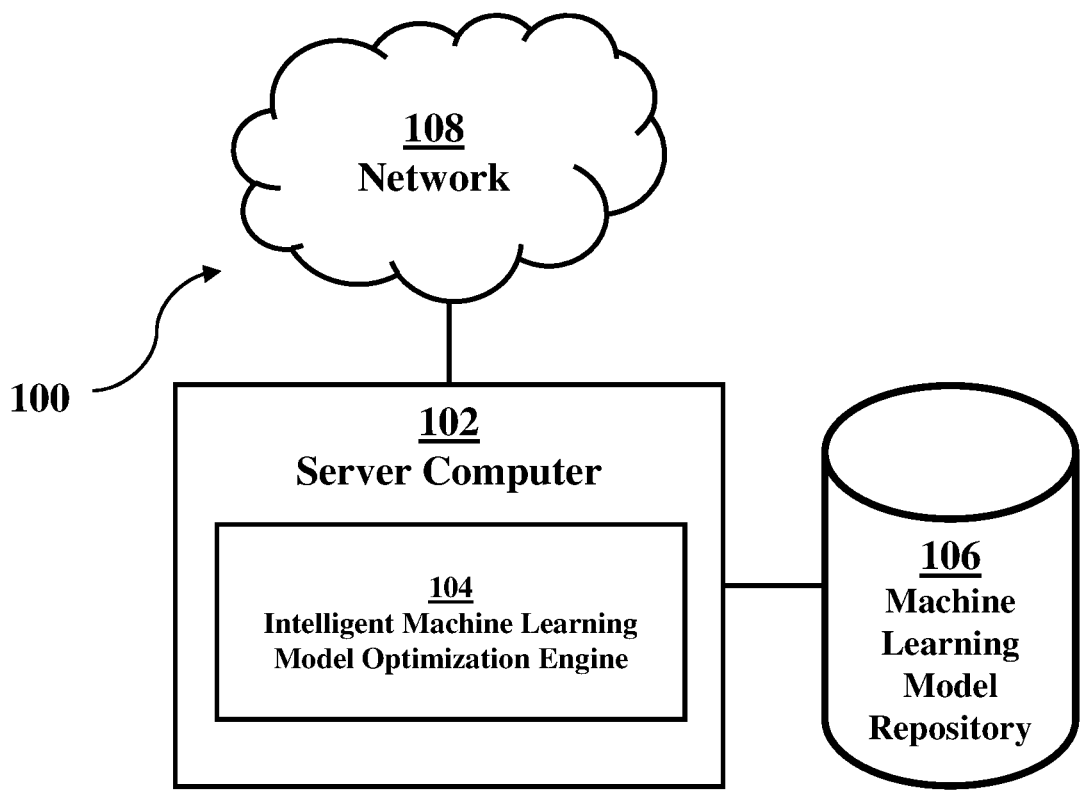
FIG. 1 is a functional block diagram of an intelligent machine learning model optimization system, generally designated 100, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Embodiments presented herein recognize the need for formulating machine learning models in deployable formats optimized to specific environments. Typically, machine learning models are configured to operate under certain computing environments. A computing environment varies but can include graphical processing units, central processing units, neural processing units, and tensor processing units. The type of processing (e.g., parallel or serial) can affect the overall performance of the model (e.g., speed, accuracy, precision, etc.). Additionally, memory requirements of a machine learning model can affect the ability to use models in certain computing environments, while under-utilizing memory can have a detrimental effect to predictive capabilities in computing systems with large memory banks. Computing environments can also include the type of computing device under which the machine learning model is operating under. Devices such as mobile phones and tablets will have less processing power and memory than a server or cloud based computing device. That being said, some coding languages are specific to machine learning models and are specially written for dedicated machine learning instruction set architectures.

In an embodiment of the invention, a template machine learning model configured for a computing environment, original dataset used to train the template machine learning model, and training pipeline data can be provided to an intelligent machine learning model optimization system. Metadata can be extracted from the training pipeline data. The metadata extracted from the training pipeline data can be mapped to one or more constraints associated with a candidate machine learning model that has been configured to a target computing environment. The candidate machine learning model can be trained within the mapped constraints, using an original dataset used to train the template machine learning model. The performance metrics of the template machine learning model can be compared to the performance metrics of the trained candidate machine learning model.

In another embodiment of the invention, an intelligent machine learning model optimization system can determine if the performance metrics of a trained candidate machine learning model exceed a performance threshold, based on the comparison to the template machine learning model. In an embodiment, if the performance metrics of the candidate machine learning model exceed the threshold, the candidate machine learning model can be deployed to the target computing environment. In an embodiment, if it is determined, the performance metrics of the candidate machine learning model do not exceed the threshold, the mapped constraints can be reduced, and the candidate machine learning model can be retrained using the reduced constraints.

In an embodiment, the intelligent machine learning model optimization system can extract one or more machine learning algorithms from the template machine learning model. Based on the extracted machine learning algorithms, one or more candidate machine learning models configured for a target environment can be identified from a machine learning model repository.

In another embodiment of the invention, extracting metadata from the training pipeline can include parsing from the programming instruction set a plurality of embedded tags. The embedded tags can be commentary from previous programmers, explaining what steps are involved in the training pipeline, for example, data processing, feature engineering, algorithm selection, tuning inference, model monitoring. In an embodiment, parsing can utilize a natural language processing model, trained to identify programming code language and processes or steps associated with in-domain use of terms.

In another embodiment of the invention, mapping extracted metadata can further include matching at least one stage of the training pipeline from the template machine learning model to a training stage in the training pipeline of a candidate machine learning model. The training pipeline of the candidate machine learning model can be configured using the matched stage and the original dataset. For example, in a candidate machine learning model where the machine learning model includes a convolutional network, the data preprocessing may clean up the original dataset by reducing the dimensions of the images in a dataset and adjusting the number of pixels per filter in the convolution.

In an embodiment, one or more an additional candidate machine learning models (e.g., 1, 2, n . . . n+1), configured to operate in the target computing environment, can be identified from a machine learning model repository based on the extracted machine learning model algorithm. The extracted metadata can be mapped to constraints of each of the additional candidate machine learning models. The additional machine learning models can be trained based on the mapped constraints and using the dataset of used to train the template machine learning model.

In an embodiment, the performance metrics of the trained candidate machine learning models can be compared to each other, or the performance metrics can be scored against the performance metrics of the template machine learning model (e.g., % accuracy, % precision, etc). In some embodiments, the score can be averaged or combined to make a cumulative total for all performance metrics. Based on the score, the candidate machine learning model with the highest score can be deployed to the target environment.

FIG. 1 is a functional block diagram of intelligent machine learning model optimization system 100. Intelligent machine learning model optimization system 100 comprises intelligent machine learning model optimization engine 104 operational on server 102, and machine learning model repository 106. Also shown in FIG. 1 is network 108 to allow for communication between server 102 and other computing devices (not shown).

Server 102 can be a standalone computing device, a management server, a web server, a mobile computing device, or any other electronic device or computing system capable of receiving, sending, and processing data. In some embodiments, server 102 can represent a server computing system utilizing multiple computers as a server system such as in cloud computing environment 50 (depicted in FIG. 5). In an embodiment, server 102 can represent a computing system utilizing clustered computers and components (e.g., database server computers, application server computers, etc.) that act as a single pool of seamless resources when accessed within intelligent machine learning model optimization system 100. In another embodiment, server 102 can be a laptop computer, a tablet computer, a netbook computer, a personal computer, a desktop computer, or any programmable electronic device or combination of programmable electronic devices capable of executing machine readable program instructions and communicating with each other and other computing devices (not depicted) within intelligent machine learning model optimization system 100 via network 108. It should be noted, while only server 102 is shown in FIG. 1, in other embodiments, multiple servers or other computing devices can be present within intelligent machine learning model optimization system 100.

Figure 4:
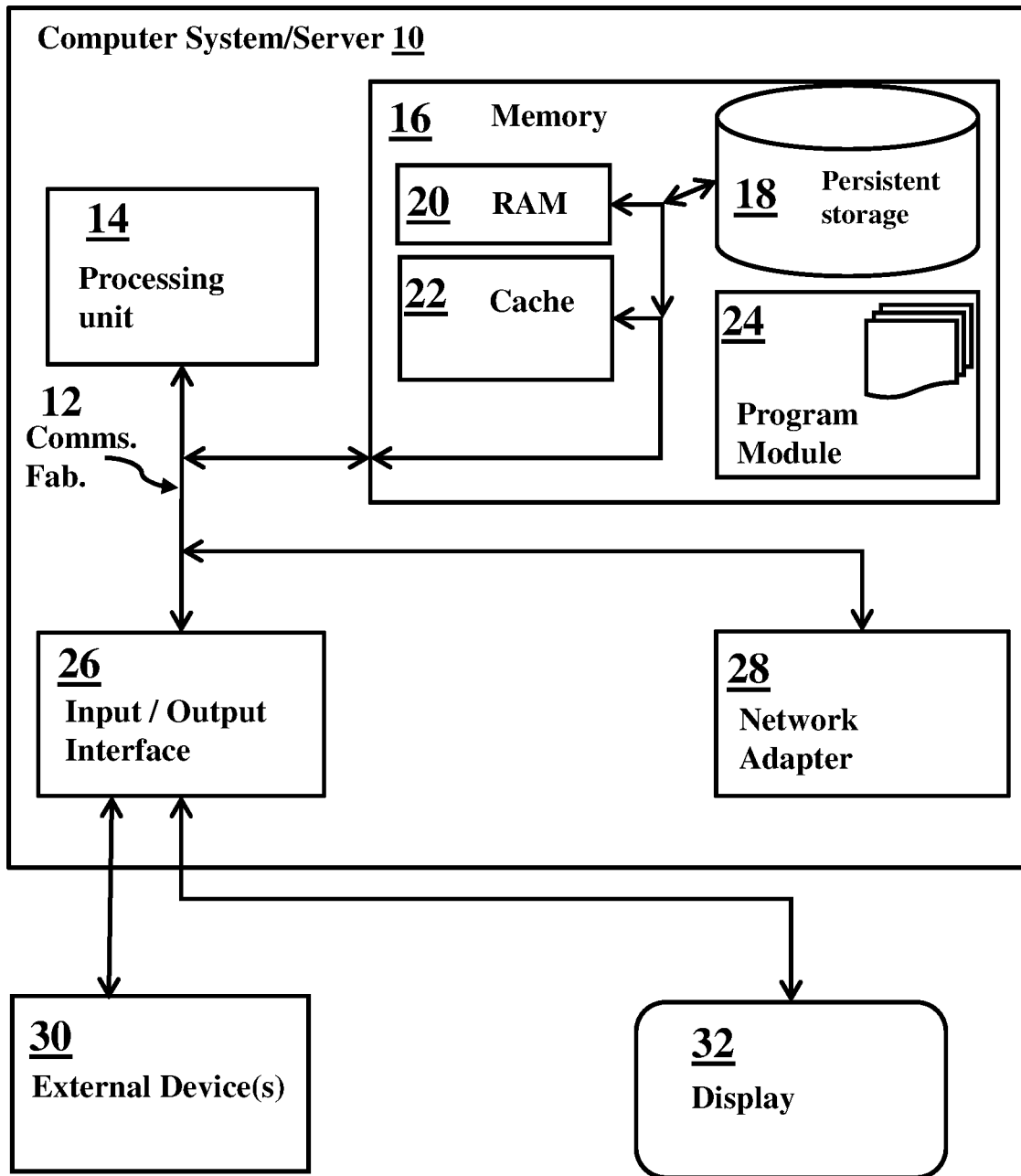
FIG. 4 is a functional block diagram of an exemplary computing system 10 within an intelligent machine learning model optimization system, in accordance with an embodiment of the present invention.

Server 102 may include components as depicted and described in further detail with respect to computer system 10 in FIG. 4. Server 102 may include components as depicted and described in further detail with respect to cloud computing node 40 of cloud computing environment 50 in FIG. 5.

Network 108 can be a telecommunications network, a local area network (LAN), a wide area network (WAN), such as the Internet, or a combination of the three, and can include wired, wireless, or fiber optic connections. Network 108 may include one or more wired and/or wireless networks that are capable of receiving and transmitting data, voice, and/or video signals, including multimedia signals that include voice, data, and video information. In general, network 108 can be any combination of connections and protocols that will support communications between server 102, and external computing devices (not shown) within intelligent machine learning model optimization system 100.

Intelligent machine learning model optimization engine 104 is a computer program capable of performing at least the following operations: (i) extracting metadata from a training pipeline for a template machine learning model, (ii) mapping the extracted metadata to one or more constraints, (iii) training a machine learning model in a target environment based on the mapped constraints, and (iv) comparing the performance metrics of the trained candidate machine learning model to the performance metrics of the template machine learning model (operations i-iv are described in further detail below), via one or more modules operational within the computer program. In some embodiments, intelligent machine learning model optimization engine 104 can be an automated or automatic machine learning (automl) program.

In an embodiment, intelligent machine learning model optimization engine 104 may be comprised of a machine learning model, capable of automatically updating itself based on feedback from a user or if new machine learning model training data becomes available. For example, the machine learning model may be able to process metadata from a training pipeline and discover new mappings to constraints. In another example, the machine learning model may be able to identify machine learning models from an extracted and/or identified machine learning algorithm within a machine learning model repository that will emulate the performance metrics of a template machine learning model, even if the identified algorithm of a candidate model is not the same architecture as the template machine learning model.

Machine learning model repository 106 is a database that stores machine learning models in one or more target environments. In an embodiment, machine learning model repository 106 can store numerous machine learning models configured for edge devices (e.g., mobile phones, tablets, etc.). The machine learning models can be any known machine learning model (e.g., binary classification, multi-class classification, regression, etc.). Further, the machine learning models can be bare architecture and/or semi-trained models trained in a specific domain, where the model can be further trained through transfer learning. For example, one or more semi-trained convolutional neural network architecture may be available to classify types of vehicles, abnormal radiology scans, written characters, etc.

Machine learning model repository 106 can also be a database of open-source (e.g., Machine learning database, tensorflow, etc.) or proprietary machine learning models. In an example, machine learning model repository 106 can be a public cloud based service with multiple machine learning models in different target environments (e.g., cloud server based, personal computer, edge device, etc.) In another embodiment, a proprietary service can be a private server for a business, government, or non-profit sector service.

Figure 2:
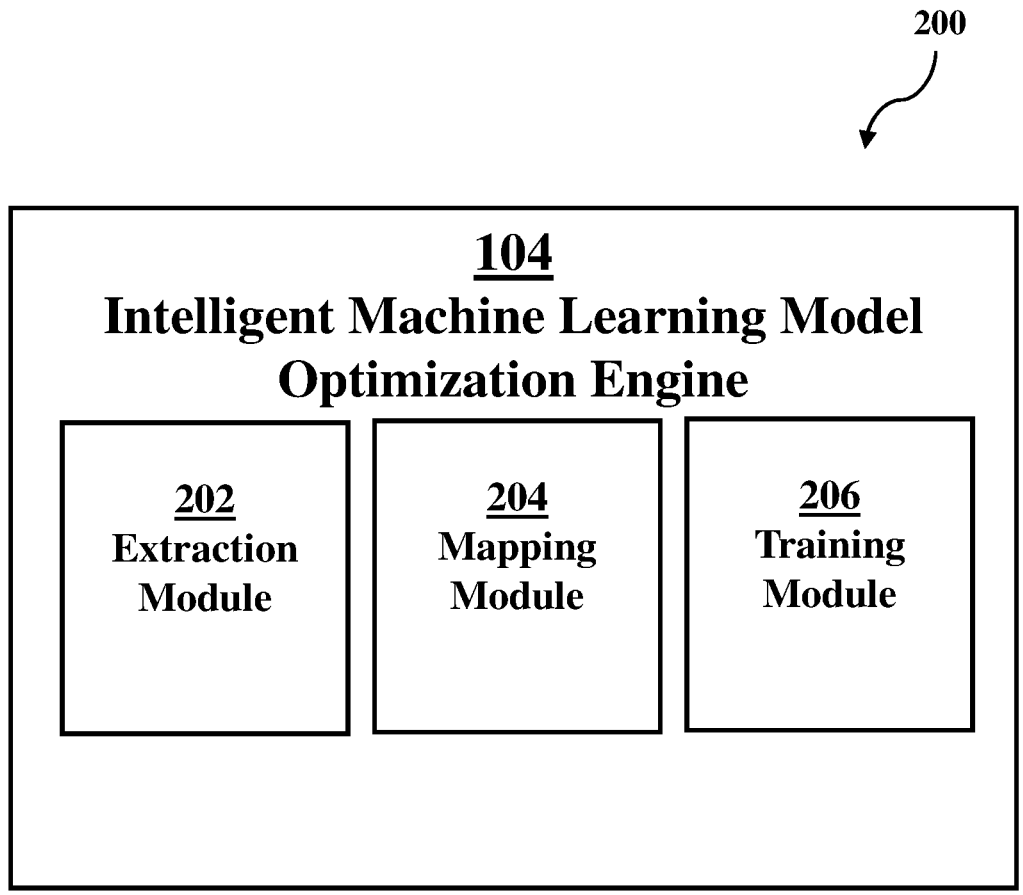
FIG. 2 is a block diagram of an intelligent machine learning model optimization engine 104, in accordance with an embodiment of the present invention.

FIG. 2 is block diagram 200 of intelligent machine learning model optimization engine 104. Intelligent machine learning model optimization engine 104 can be comprised of extraction module 202, mapping module 204, and training module 206.

Extraction module 202 is a computer module that can be configured to receive inputs regarding a template machine learning model and extract pertinent data from the inputs. In an embodiment, extraction module 202 can receive input parameters, including but not limited to: (i) a trained template model in a specific environment (e.g., Jupyter notebook, SPSS®, Google Colab, etc. . . . ), (ii) training and testing data sets used to train the candidate model, (iii) training pipeline data (e.g., stages of data processing, feature engineering, etc), (iv) training metadata (e.g., the database the candidate machine learning model originated from, algorithms used to train the template machine learning model), (v) output metrics (e.g., performance metrics of the template machine learning model (precision, recall, area under curve of receiver characteristic operator, etc)), and (vi) target environment.

In an embodiment, extraction module 202 can extract the metadata of the template machine learning model's training pipeline. The metadata can be extracted through an analysis of the machine learning model's programming code. The algorithm can reveal the process the template machine learning model utilizes to process the data training set and generate a prediction. For example, extraction module 202 can be configured to analyze Python, Java, C++, and/or other suitable machine learning programming language and associated machine learning library tools. Extraction module 202 can recognize specific commands via natural language processing capabilities.

In an embodiment, extraction module 202 can be an intelligent agent that can identify stages associated with training a template machine learning model by analyzing programming code of a template machine learning model. For example, the intelligent agent can be trained to identify the type of model (e.g., classification, regression, multivariable classification, etc.) and the architecture of the model (e.g., neural network, deep neural network, decision tree, etc.), as well as the sub-category of the model architecture (e.g., recurrent neural network, graph neural network, convolutional neural network, variational autoencoder, etc.) if there is one. It should be noted, extraction module 202 can analyze any explanation tags embedded within the programming code by programmers corresponding to steps or stages within the training pipeline (e.g., data processing, feature engineering, etc.).

Mapping module 204 is a computer module that can be configured to receive an extracted data of inputs of the candidate machine learning model from extraction module 202 and identify an abnormal condition from the highlighted sections of the medical scan. In an embodiment, mapping module 204 can correlate extracted data from a template machine learning model to a candidate machine learning model's training process. For example, the template machine learning model may have data processing steps extracted by extraction module 202. The candidate machine learning model may have similar data processing steps indicated in the programming code (e.g., explanation tags embedded within by programmers), however, in other models there may not be steps in which data is processed (i.e., the steps may have differences). A candidate machine learning model configured for natural language processing may not have as large of a lookback window in the candidate machine learning model or it may have fewer output nodes associated with its architecture. Mapping module 204 can identify the constraints associated with the candidate model and map the embedded metadata associated with the training pipeline to the constraints.

In another embodiment, mapping module 204 can identify one or more candidate machine learning models in a target environment that will perform similar to the template machine learning model. For example, mapping module 204 can receive algorithm data for a template machine learning model from extraction module 202. Based on the algorithm data, mapping module 204 can search machine learning model repository 106 for candidate machine learning models in a target environment. In an embodiment, mapping module 204 can search for similar steps within the algorithm based on the programming code, or descriptions in the headings associated with the template machine learning model.

In an embodiment, mapping module 204 can constrain the exploration search space for candidate machine learning models to target libraries based on the target environment (e.g., a Pytorch or tensorflow library for mobile devices). In some embodiments, the target environment can further be constrained to specific operating systems or hardware, based on the target environment. In another aspect, mapping module 204 may determine through a machine learning process that certain constraints in template machine learning models configured in some environments are not compatible with some target environments (e.g., dynamic memory requirements, specific processing commands between x86 processing and RISC processors, etc), and can ignore mapping such constraints.

Training module 206 is a computer module that can be configured to train a candidate machine learning model in a target environment, based on the constraints mapped by mapping module 204. In an embodiment, training module 206 can seek to emulate the template machine learning model as closely as possible using the constraints such as data processing and feature engineering in one or more candidate machine learning models from machine learning model repository 106 identified by mapping module 204. In an embodiment, training module 206 can train the candidate machine learning models in the target environment, using the original training data set used to train the template machine learning model.

In an embodiment, training module 206 can compare the performance metrics of a trained candidate machine learning model configured to a target environment, to the performance metrics of the template machine learning model. The goal of training is to emulate the template machine learning model as closely as possible. For example, in a classification model, training module 206 can utilize one or more performance metrics to compare the accuracy and/or precision of the candidate machine learning model.

In some embodiments, the comparison of performance metrics can be a score (e.g., a percentage, or line fit). A score can be how closely a regression line fits to the template machine learning model in the search space. In another example, in an generative variational autoencoder, it can be the percentage of generated images or sound clips that fool the classification encoder.

In an embodiment, training module 206 can generate an emulation score, which can be used to evaluate multiple trained candidate machine learning models. The emulation score can be the scored comparison as described above. The scores can be ranked with the candidate machine learning model with the closest emulation of the template machine learning model being ranked highest, depending on which performance metric is weighted higher or in the case of a cumulative score for all performance metrics in which each score is graded out of 100 and added together.

In some embodiments, a training score may include generating the emulation score by factoring in additional metrics which may be considered in an overall score, such as performance in the target environment, computing resource utilization, and user rating of the machine learning model.

In an embodiment, training module 206 can deploy the trained candidate machine learning model to the target environment. In an embodiment, a threshold for the emulation score can cause training module 206 to automatically deploy the template machine learning model to the target environment. In an aspect, if multiple candidate machine learning models have emulation scores above the threshold, the candidate machine learning model with the highest score can be deployed in the target environment. In an embodiment, candidate machine learning models above a threshold can be presented to a user along with the performance metrics. Training module 206 can identify with an explanation of each performance metric compared to the template machine learning model and any differences in the algorithm or training pipeline of the presented machine learning model due to target environment constraints.

In an embodiment, training module 206 can send feedback to mapping module 204 in the event that no candidate machine learning models exceed the emulation score threshold. In another embodiment, training module 206 can return performance metrics correlating to specific steps in the training pipeline, such as number of iterations required to achieve a desired accuracy in a classification module. In another example, performance metrics associated with filter size or lookback windows of neural networks can be further strengthened to specific programming commands or stage headings (e.g., convolutional neural network programming via python, Pytorch library associate, and the like) associated with machine learning algorithms.

Figure 3:
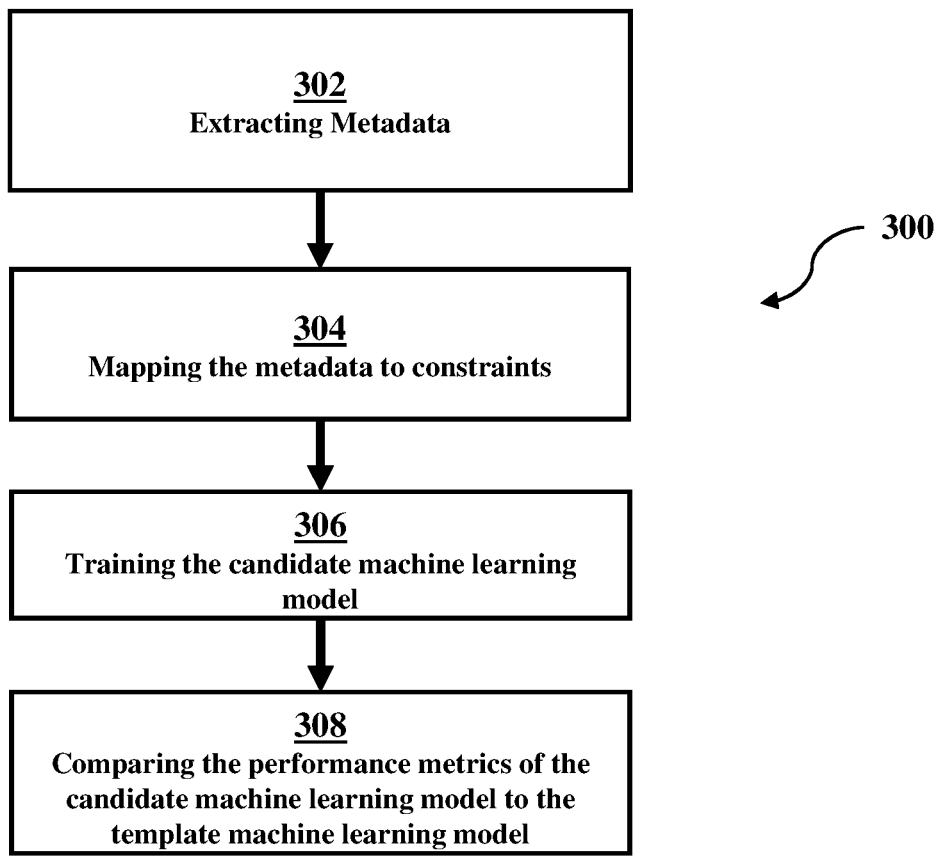
FIG. 3 is flowchart of a method for intelligently optimizing a machine learning model for a target computing environment 300, in accordance with an embodiment of the present invention.

FIG. 3 is a flowchart depicting method 300 for intelligent machine learning model optimization, in accordance with an embodiment of the present invention. At step 302, extraction module 202 can extract metadata associated with a template machine learning model from received input data (e.g., training pipeline data and/or machine learning algorithm data) for the template machine learning model. At step 304, mapping module 204 can map the extracted metadata to constraints (e.g., data processing, feature engineering, available memory, processing capability, programming language) associated with a candidate machine learning model. At step 306, training module 206 can train a candidate machine learning model configured for a target environment, based on the mapped constraints. At step 308, training module 206 can compare the performance metrics of the candidate machine learning model to the performance metrics of the template machine learning model.

FIG. 4 depicts computer system 10, an example computer system representative of server 102, or any other computing device within an embodiment of the present invention. Computer system 10 includes communications fabric 12, which provides communications between processing unit 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes persistent storage 18, random access memory (RAM) 20, cache 22, and program module 24. In general, memory 16 can include any suitable volatile or non-volatile computer readable storage media. Cache 22 is a fast memory that enhances the performance of processing unit 14 by holding recently accessed data, and data near recently accessed data, from memory 16. As will be further depicted and described below, memory 16 may include at least one of program module 24 that is configured to carry out the functions of embodiments of the invention.

The program/utility (e.g., intelligent machine learning model optimization engine 104), having at least one program module 24, may be stored in memory 16 by way of example, and not limiting, as well as an operating system, one or more application programs, other program modules, and program data. Each of the operating systems, one or more application programs, other program modules, and program data or some combination thereof, may include an implementation of a networking environment. Program module 24 generally carries out the functions and/or methodologies of embodiments of the invention, as described herein.

Program instructions and data used to practice embodiments of the present invention may be stored in persistent storage 18 and in memory 16 for execution by one or more of the respective processing unit 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device. External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor, touchscreen, or virtual graphical user interface.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
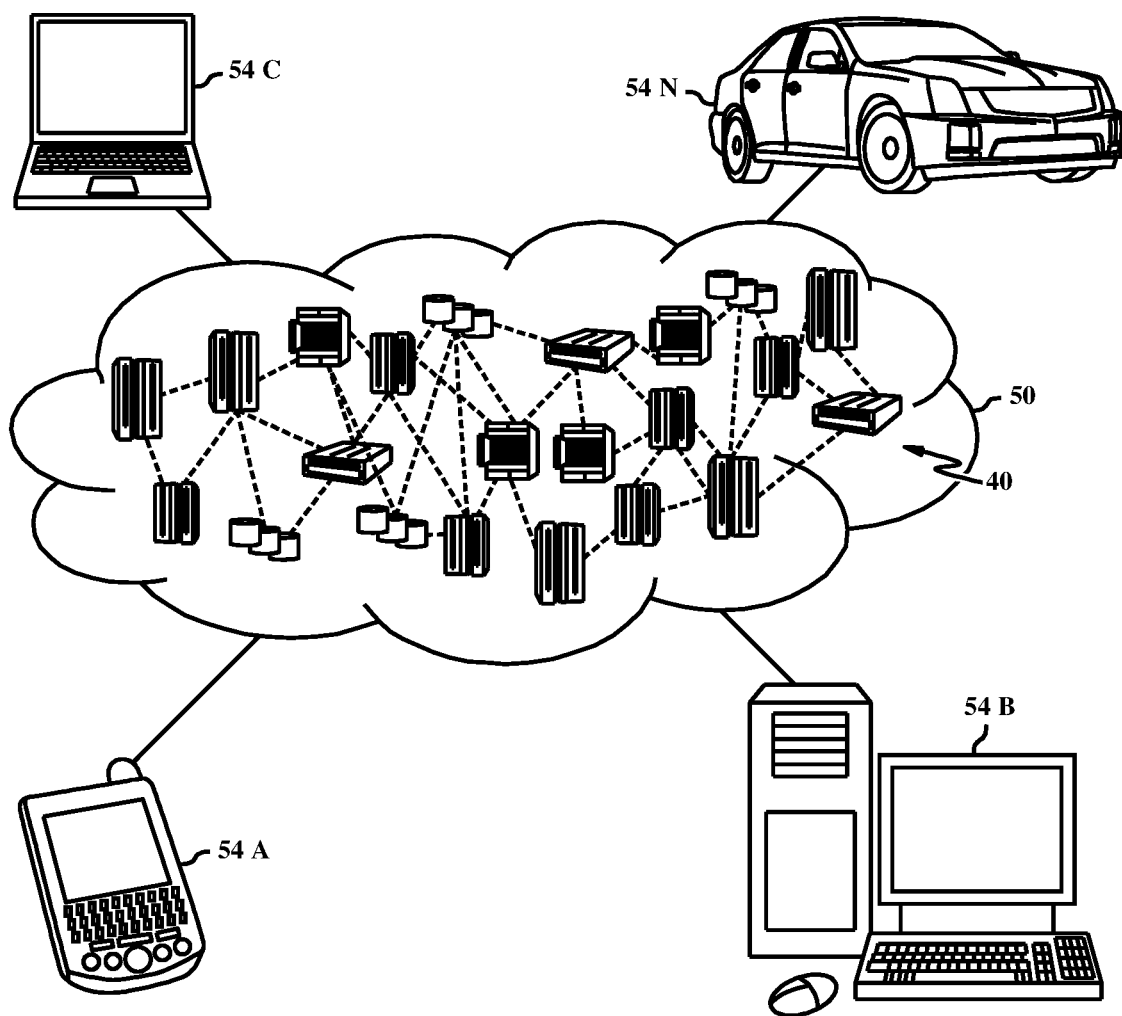
FIG. 5 is a diagram depicting a cloud computing environment 50, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
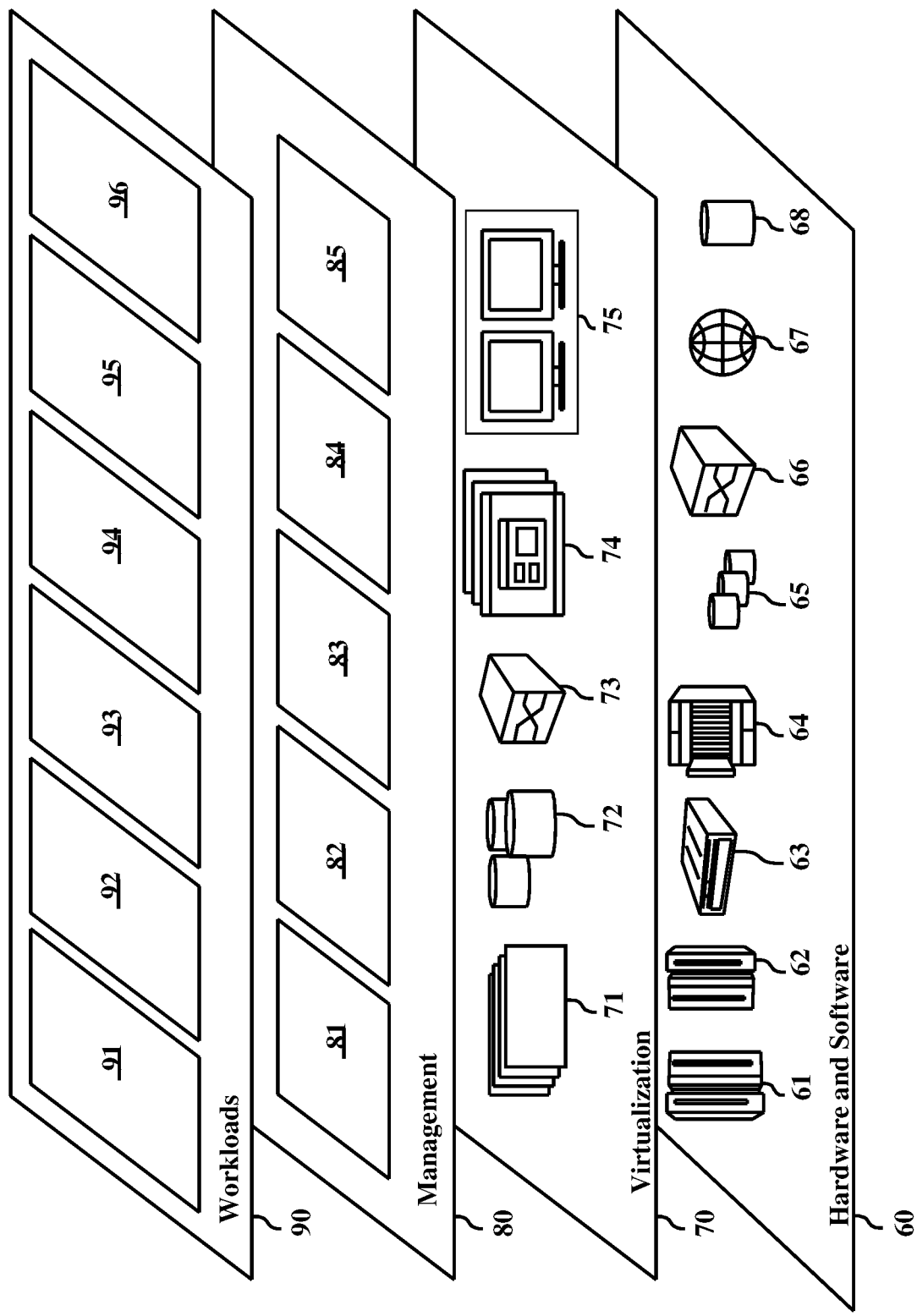
FIG. 6 is a functional block diagram depicting abstraction model layers, in accordance with an embodiment of the present invention.

Referring now to FIG. 6, a set of functional abstraction layers provided by cloud computing environment 50 (depicted in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and intelligent machine learning model optimization 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

What is claimed is:

1. A computer-implemented method for intelligent optimization of machine learning models, the method comprising:
    extracting, by a processor, metadata from a training pipeline for a first machine learning model, wherein the first machine learning model is configured to a first computing environment, and wherein the first machine learning model comprises a convolutional neural network;
    mapping, by the processor, the extracted metadata to one or more constraints associated with a second machine learning model configured to a second computing environment, and wherein the second machine learning model comprises a convolutional neural network;
    training, by the processor, the second machine learning model configured to the second computing environment based, at least in part, on the mapped one or more constraints, with a dataset used to train the first machine learning model, wherein training comprises preprocessing a dataset by reducing dimension of images in a dataset and adjusting a number of pixels per filter in the convolution; and
    comparing, by the processor, one or more performance metrics of the first machine learning model to one or more performance metrics of the trained second machine learning model configured to the second computing environment.

2. The computer-implemented method of claim 1, further comprising:
    determining, by the processor, if the one or more performance metrics of the trained second machine learning model configured to the second computing environment exceed a performance threshold; and
    responsive to determining the one or more performance metrics of the trained second machine learning model configured to the second computing environment exceed the performance threshold, deploying, by the processor, the second machine learning model configured to the second computing environment to the second computing environment.

3. The computer-implemented method of claim 1, further comprising:
    extracting, by the processor, a machine learning algorithm from the first machine learning model based, at least in part, on the training pipeline metadata; and
    identifying, by the processor, the second machine learning model configured to the second computing environment based, at least in part on, the extracted machine learning algorithm.

4. The computer-implemented method of claim 3, wherein mapping the metadata extracted from the training pipeline for the first machine learning model to one or more constraints further comprises:
    matching, by the processor, at least one stage of the first machine learning model's training pipeline to at least one stage of the second machine learning model configured to the second computing environment; and
    configuring, by the processor, a training pipeline for the second machine learning model based, at least in part, on the matched at least one stage of the first machine learning model training pipeline.

5. The computer-implemented method of claim 3, further comprising:
identifying, by the processor, a third machine learning model configured for the second environment based, at least in part, on the machine learning algorithm extracted from the first machine learning model;
mapping, by the processor, the extracted metadata to one or more constraints associated with the third machine learning model configured to the second computing environment; and
training, by the processor, the third machine learning model configured to the second computing environment based, at least in part, on the mapped one or more constraints, with the dataset used to train the first machine learning model.

6. The computer-implemented method of claim 5, further comprising:
scoring, by the processor, a performance of each of the second trained machine learning model and the third trained machine learning model based, at least in part, on respective performance metrics for the second and third trained machine learning models; and
deploying, by the processor, to the second computing environment, a machine learning model with a highest score.

7. The computer-implemented method of claim 1, wherein extracting metadata from the first machine learning model further comprises:
parsing, by the processor, a plurality of embedded tags in the training pipeline, wherein the embedded tags are within a programming code of the first machine learning model.

8. A computer system for intelligent optimization of machine learning models, the system comprising:
one or more computer processors;
one or more non-transitory computer readable storage devices; and
computer program instructions stored on the one or more computer readable storage devices, comprising instructions to:
extract metadata from a training pipeline for a first machine learning model, wherein the first machine learning model is configured to a first computing environment, and wherein the first machine learning model comprises a convolutional neural network;
map the extracted metadata to one or more constraints associated with a second machine learning model configured to a second computing environment, wherein the second machine learning model comprises a convolutional neural network;
train the second machine learning model configured to the second computing environment based, at least in part, on the mapped one or more constraints, with a dataset used to train the first machine learning model, wherein training comprises preprocessing a dataset by reducing dimensions of images in a dataset and adjusting a number of pixels per filter in the convolution; and
compare one or more performance metrics of the first machine learning model to one or more performance metrics of the trained second machine learning model configured to the second computing environment.

9. The computer system of claim 8, further comprising instructions to:
determine if the one or more performance metrics of the trained second machine learning model configured to the second computing environment exceed a performance threshold; and
responsive to determining the one or more performance metrics of the trained second machine learning model configured to the second computing environment exceed the performance threshold, deploy the second machine learning model configured to the second computing environment to the second computing environment.

10. The computer system of claim 8, further comprising instructions to:
extract a machine learning algorithm from the first machine learning model based, at least in part, on the training pipeline metadata; and
identify the second machine learning model configured to the second computing environment based, at least in part on, the extracted machine learning algorithm.

11. The computer system of claim 10, wherein mapping the metadata extracted from the training pipeline for the first machine learning model to one or more constraints further comprises:
match at least one stage of the first machine learning model's training pipeline to at least one stage of the second machine learning model configured to the second computing environment; and
configure a training pipeline for the second machine learning model based, at least in part, on the matched at least one stage of the first machine learning model training pipeline.

12. The computer system of claim 10, further comprising instructions to:
identify a third machine learning model configured for the second environment based, at least in part, on the machine learning algorithm extracted from the first machine learning model;
map the extracted metadata to one or more constraints associated with the third machine learning model configured to the second computing environment; and
train the third machine learning model configured to the second computing environment based, at least in part, on the mapped one or more constraints, with the dataset used to train the first machine learning model.

13. The computer system of claim 12, further comprising instructions to:
score a performance of each of the second trained machine learning model and the third trained machine learning model based, at least in part, on respective performance metrics for the second and third trained machine learning models; and
deploy to the second computing environment, a machine learning model with a highest score.

14. The computer system of claim 10, wherein extracting metadata from the first machine learning model further comprises:
parse a plurality of embedded tags in the training pipeline, wherein the embedded tags are within a programming code of the first machine learning model.

15. A computer program product for intelligent optimization of machine learning models, the computer program product comprising:
a non-transitory computer readable storage device having program instructions embodied therewith, the program instructions executable by a processor to cause the processors to perform a function, the program instructions comprising:

program instructions to extract metadata from a training pipeline for a first machine learning model, wherein the first machine learning model is configured to a first computing environment, and wherein the first machine learning model comprises a convolutional neural network;

program instructions to map the extracted metadata to one or more constraints associated with a second machine learning model configured to a second computing environment, and wherein the second machine learning model comprises a convolutional neural network;

program instructions to train the second machine learning model configured to the second computing environment based, at least in part, on the mapped one or more constraints, with a dataset used to train the first machine learning model, wherein training comprises preprocessing a dataset by reducing dimensions of images in a dataset and adjusting a number of pixels per filter in the convolution; and program instructions to compare one or more performance metrics of the first machine learning model to one or more performance metrics of the trained second machine learning model configured to the second computing environment.

16. The computer program product of claim 15, further comprising:

program instructions to determine if the one or more performance metrics of the trained second machine learning model configured to the second computing environment exceed a performance threshold; and responsive to determining the one or more performance metrics of the trained second machine learning model configured to the second computing environment exceed the performance threshold, program instructions to deploy the second machine learning model configured to the second computing environment to the second computing environment.

17. The computer program product of claim 15, further comprising:

program instructions to extract a machine learning algorithm from the first machine learning model based, at least in part, on the training pipeline metadata; and program instructions to identify the second machine learning model configured to the second computing environment based, at least in part on, the extracted machine learning algorithm.

18. The computer program product of claim 17, wherein mapping the metadata extracted from the training pipeline for the first machine learning model to one or more constraints further comprises:

program instructions to match at least one stage of the first machine learning model's training pipeline to at least one stage of the second machine learning model configured to the second computing environment; and program instructions to configure a training pipeline for the second machine learning model based, at least in part, on the matched at least one stage of the first machine learning model training pipeline.

19. The computer program product of claim 17, Further comprising:

program instructions to identify a third machine learning model configured for the second environment based, at least in part, on the machine learning algorithm extracted from the first machine learning model;

program instructions to map the extracted metadata to one or more constraints associated with the third machine learning model configured to the second computing environment; and program instructions to train the third machine learning model configured to the second computing environment based, at least in part, on the mapped one or more constraints, with the dataset used to train the first machine learning model.

20. The computer program product of claim 17, further comprising:

program instructions to score a performance of each of the second trained machine learning model and the third trained machine learning model based, at least in part, on respective performance metrics for the second and a third trained machine learning models; and program instructions to deploy to the second computing environment, a machine learning model with a highest score.

* * * * *